US012260795B2

(12) United States Patent
Aoki et al.

(10) Patent No.: US 12,260,795 B2
(45) Date of Patent: Mar. 25, 2025

(54) PROJECTION TYPE DISPLAY APPARATUS

(71) Applicant: SEIKO EPSON CORPORATION, Tokyo (JP)

(72) Inventors: Toru Aoki, Shiojiri (JP); Kazuhisa Mizusako, Shiojiri (JP); Yusuke Komuro, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 18/617,892

(22) Filed: Mar. 27, 2024

(65) Prior Publication Data

US 2024/0331600 A1 Oct. 3, 2024

(30) Foreign Application Priority Data

Mar. 28, 2023 (JP) ................................ 2023-051087

(51) Int. Cl.
*G09G 3/36* (2006.01)
*G09G 3/00* (2006.01)

(52) U.S. Cl.
CPC ............... *G09G 3/007* (2013.01); *G09G 3/36* (2013.01); *G09G 2320/0247* (2013.01)

(58) Field of Classification Search
CPC .... G09G 3/002; G09G 3/2003; G09G 3/3607; G09G 3/007; G09G 2340/0464; G09G 2300/0426; H04N 9/317; H04N 9/3188; H04N 9/3197
See application file for complete search history.

(56) References Cited

U.S. PATENT DOCUMENTS

| | | | | |
|---|---|---|---|---|
| 6,906,726 | B2 * | 6/2005 | Suzuki | G09G 3/2059 345/596 |
| 9,354,494 | B2 * | 5/2016 | Mashitani | H04N 9/3188 |
| 11,057,596 | B2 * | 7/2021 | Okada | H04N 9/3188 |
| 11,595,627 | B2 * | 2/2023 | Hosaka | G09G 3/3607 |
| 12,080,205 | B2 * | 9/2024 | Lee | G06V 40/1318 |
| 2003/0006994 | A1 * | 1/2003 | Suzuki | G09G 3/2059 345/596 |
| 2015/0219983 | A1 * | 8/2015 | Mashitani | H04N 9/3188 353/121 |
| 2015/0371577 | A1 * | 12/2015 | Hosaka | G09G 3/007 345/56 |

(Continued)

FOREIGN PATENT DOCUMENTS

| | | |
|---|---|---|
| JP | 2015-176019 A | 10/2015 |
| JP | 2020-107984 A | 7/2020 |

*Primary Examiner* — Olga V Merkoulova
(74) *Attorney, Agent, or Firm* — Oliff PLC

(57) ABSTRACT

A projection type display apparatus includes a liquid crystal panel including a first panel pixel, a liquid crystal panel including a second panel pixel, an optical path shift element that shifts projection positions of the first panel pixel and the second panel pixel, and a display control circuit that controls the liquid crystal panel and the optical path shift element. The display control circuit causes the optical path shift element to shift the projection position from a first unit period to a fourth unit period of one frame period for each unit period. A centroid of a path on which the first panel pixel is projected from the first unit period to the fourth unit period is different from a centroid of a path on which the second panel pixel is projected from the first unit period to the fourth unit period.

6 Claims, 14 Drawing Sheets

(56) References Cited

U.S. PATENT DOCUMENTS

| | | | | |
|---|---|---|---|---|
| 2020/0213567 | A1* | 7/2020 | Okada | H04N 9/3188 |
| 2021/0076015 | A1* | 3/2021 | Hosaka | G09G 3/002 |
| 2024/0331600 | A1* | 10/2024 | Aoki | G09G 3/36 |

* cited by examiner

FIG. 22
• Odd Frame
A11
B11
A21
D11
C11
D21
A12
B12
A22
• Even Frame
A11
B11
A21
D11
C11
D21
A12
B12
A22

PROJECTION TYPE DISPLAY APPARATUS

The present application is based on, and claims priority from JP Application Serial Number 2023-051087, filed Mar. 28, 2023, the disclosure of which is hereby incorporated by reference herein in its entirety.

BACKGROUND

1. Technical Field

The present disclosure relates to a projection type display apparatus.

2. Related Art

A technology for increasing resolution in a pseudo manner with an optical path shift element in a projection type display apparatus that projects image light created by a liquid crystal panel or the like onto a screen or the like is known. Specifically, in the projection type display apparatus, one frame period is divided into a plurality of unit periods, and a projection position of one panel pixel in a liquid crystal panel is shifted for each of the plurality of unit periods so that a gradation level designated by a plurality of pieces of pixel data in video data is expressed (see JP-A-2020-107984, for example).

However, in the technology, there is a problem in that, for example, display unevenness in which a bright region and a dark region appear is visually recognized when a projected image is enlarged.

SUMMARY

In order to solve the above problems, a projection type display apparatus according to an aspect of the present disclosure includes a first liquid crystal panel including a first panel pixel corresponding to first light, a second liquid crystal panel including a second panel pixel corresponding to second light, an optical path shift element configured to shift projection positions of the first panel pixel and the second panel pixel, and a display control circuit configured to control the first liquid crystal panel, the second liquid crystal panel, and the optical path shift element, wherein the display control circuit shifts the projection position every k unit period from a first unit period to a k-th unit period included in one frame period, k being an integer equal to or greater than 2 included in one frame period with respect to the optical path shift element, converts pixel data of the first light among pixel data constituting a video image, the pixel data corresponding to the projection position, for each unit period and supplies the converted pixel data to the first panel pixel, and converts pixel data of the second light, the pixel data corresponding to the projection position, for each unit period and supplies the converted pixel data to the second panel pixel, and a centroid of a path on which the first panel pixel is projected from the first unit period to the k-th unit period is different from a centroid of a path on which the second panel pixel is projected from the first unit period to the k-th unit period.

DESCRIPTION OF EMBODIMENTS

Hereinafter, a projection type display apparatus according to embodiments will be described with reference to the drawings. In each of the drawings, dimensions and scales of each portion are appropriately made different from actual ones. Further, since embodiments to be described below are suitable specific examples, various technically preferable limitations are applied, but the scope of the present disclosure is not limited to these embodiments unless where specifically stated that the present disclosure is limited in the following description.

Figure 1:
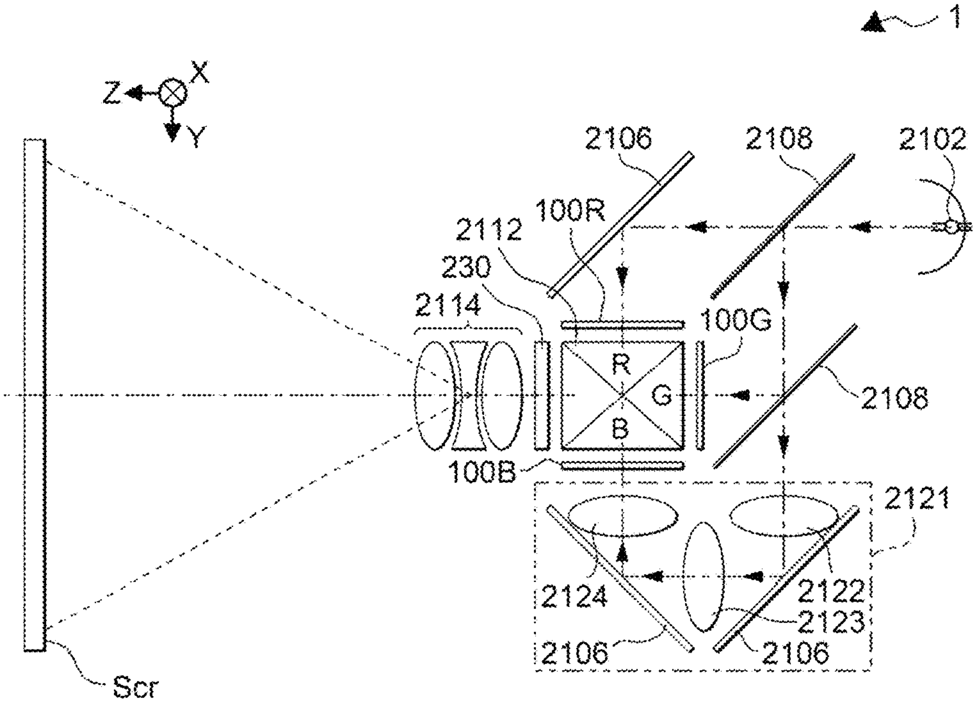
FIG. 1 is a diagram illustrating a projection type display apparatus according to a first embodiment.

FIG. 1 is a diagram illustrating an optical configuration of a projection type display apparatus 1 according to a first embodiment. As illustrated in FIG. 1, the projection type display apparatus 1 includes liquid crystal panels 100R, 100G, and 100B. Further, a lamp unit 2102 including a white light source such as a halogen lamp is provided inside the projection type display apparatus 1. Projection light emitted from the lamp unit 2102 is split into three primary colors including red (R), green (G), and blue (B) by three mirrors 2106 and two dichroic mirrors 2108 disposed inside the projection type display apparatus 1. Among the light, light of R, light of G, and light of B are incident on the liquid crystal panel 100R, the liquid crystal panel 100G, and the liquid crystal panel 100B, respectively.

Since an optical path for B is longer than an optical path for R and an optical path for G, it is necessary to prevent a loss in the optical path for B. Thus, a relay lens system 2121 including an incidence lens 2122, a relay lens 2123, and an emission lens 2124 is provided at the optical path for B.

The liquid crystal panel 100R includes a plurality of pixel circuits. Each of the plurality of pixel circuits includes a liquid crystal element. The liquid crystal element of the liquid crystal panel 100R is driven based on a data signal corresponding to R as will be described below, resulting in a transmittance corresponding to a voltage of the data signal. Thus, in the liquid crystal panel 100R, transmittances of the liquid crystal elements are individually controlled so that a transmitted image of R is generated. Similarly, in the liquid crystal panel 100G, a transmitted image of G is generated based on a data signal corresponding to G, and in the liquid crystal panel 100B, a transmitted image of B is generated based on a data signal corresponding to B.

The transmitted images of the colors generated by the liquid crystal panels 100R, 100G, and 100B are incident on a dichroic prism 2112 from three directions. In the dichroic prism 2112, light of R and light of B are refracted at 90 degrees, whereas light of G travels straight. Thus, the dichroic prism 2112 combines the images of the respective colors. A combined image generated by the dichroic prism 2112 is incident on a projection lens 2114 via an optical path shift element 230.

The projection lens 2114 enlarges and projects the combined image passing through the optical path shift element 230, onto a screen Scr.

The optical path shift element 230 shifts the combined image emitted from the dichroic prism 2112. Specifically, the optical path shift element 230 shifts the image projected onto the screen Scr in a left-right direction and/or in an up-down direction with respect to a projection surface.

The images transmitted by the liquid crystal panels 100R and 100B are reflected by the dichroic prism 2112 and then are projected, whereas the image transmitted by the liquid crystal panel 100G travels straight and is projected. Thus, the respective images transmitted by the liquid crystal panels 100R and 100B are laterally inverted with respect to the transmitted image of the liquid crystal panel 100G.

For convenience of description, with the projection surface of the screen Scr viewed from the projection type display apparatus 1, the left-right direction is defined as an X-axis and the up-down direction is defined as a Y-axis. Between left and right directions along the X-axis, the right direction is referred to as an X direction, and the left direction is referred to as a direction opposite to the X direction. Further, a downward direction between the up and down directions along the Y-axis is referred to as a Y direction, and an upward direction is referred to as a direction opposite to the Y direction. A projection direction of the projection type display apparatus 1 is defined as a Z-direction.

Figure 2:
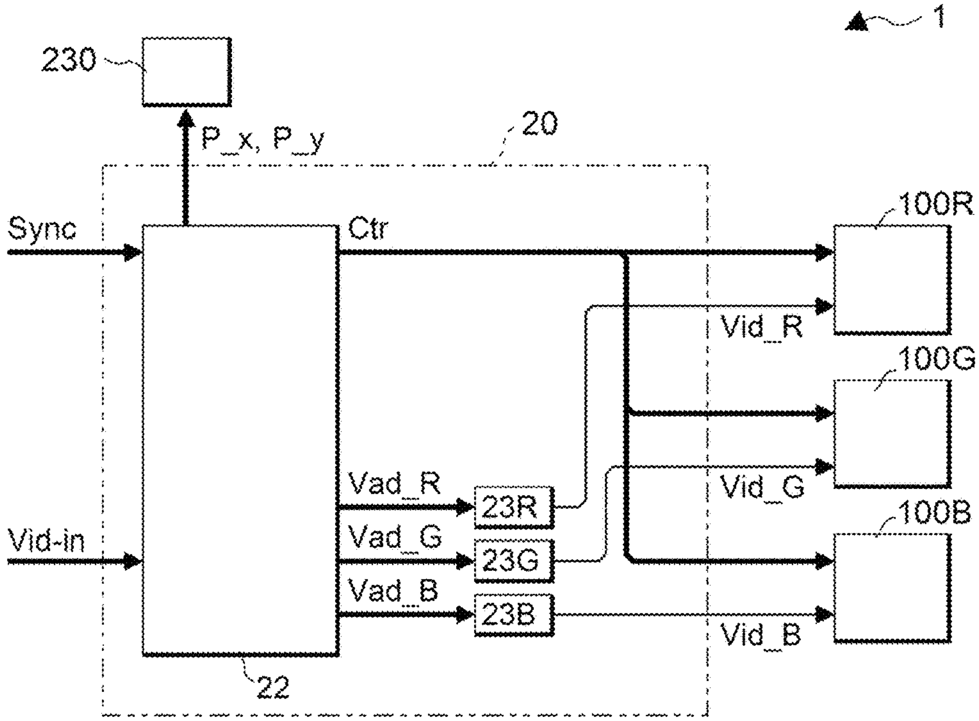
FIG. 2 is a block diagram illustrating a configuration of the projection type display apparatus.

FIG. 2 is a block diagram illustrating an electrical configuration of the projection type display apparatus 1. As illustrated in FIG. 2, the projection type display apparatus 1 includes a display control circuit 20, the above-described liquid crystal panels 100R, 100G, and 100B, and the optical path shift element 230.

Video data Vid-in is supplied from a high-level apparatus such as a host apparatus (not illustrated) in synchronization with a synchronization signal Sync. The video data Vid-in designates a gray scale level of a pixel in an image to be displayed, for example, by 8 bits for each of RGB.

The pixel in the image designated by the video data Vid-in is referred to as a video pixel, data designating gradation level of the video pixel is referred to as pixel data, and a pixel in an image before combination by the liquid crystal panel 100R, 100G, or 100B is referred to as a panel pixel. Further, a position of the panel pixel shifted by the optical path shift element 230 and projected onto the screen Scr is referred to as a projection position.

In the liquid crystal panels 100R, 100G, and 100B, the panel pixels are arrayed in a matrix along the X-axis and the Y-axis when viewed in a projected image. In the first embodiment, an array of the video pixels of which the gradation levels are designated in the video data Vid-in is, for example, twice the array of the panel pixels of the liquid crystal panels 100R, 100G, or 100B in both the vertical direction and the lateral direction.

In the first embodiment, a color image projected onto the screen Scr is expressed by combining the transmitted images of the liquid crystal panels 100R, 100G, and 100B. Thus, a pixel which is a minimum unit of the color image can be divided into a red sub-pixel by the liquid crystal panel 100R, a green sub-pixel by the liquid crystal panel 100G, and a blue sub-pixel by the liquid crystal panel 100B. However, for example, when there is no need to specify colors of the sub-pixels in the liquid crystal panels 100R, 100G, and 100B, or when only brightness is handled as a problem, the sub-pixels do not need to be intentionally referred to as sub-pixels. Therefore, in the present description, the panel pixel is also used as a display unit in the liquid crystal panels 100R, 100G, and 100B.

The synchronization signal Sync includes a vertical synchronization signal for instructing vertical scanning start for the video data Vid-in, a horizontal synchronization signal for instructing horizontal scanning start, and a clock signal indicating a timing for one video pixel in the video data Vid-in.

The display control circuit 20 includes a processing circuit 22, and conversion circuits 23R, 23G, and 23B.

The processing circuit 22 once accumulates the video data Vid-in supplied from the high-level apparatus for one or two or more frame periods in an internal buffer, and then outputs the pixel data of the video pixel corresponding to the projection position by the optical path shift element 230, for each of RGB components.

In the pixel data output from the processing circuit 22, the R component is denoted as pixel data Vad_R, the G component is denoted as pixel data Vad_G, and the B component is denoted as pixel data Vad_B. Further, in the present embodiment, the video pixel designated by the pixel data Vad_G is not the same as the video pixels designated by the pixel data Vad_R and Vad_B. As will be described in detail below, the video pixels designated by the pixel data Vad_R and Vad_B are shifted by one pixel in terms of the video pixel in the right direction and by one pixel in terms of the video pixel in the downward direction with reference to the video pixel designated by the pixel data Vad_G.

In the present embodiment, since the projection position changes in each unit period obtained by dividing one frame period into four, four projection positions can be set in four unit periods in one consecutive frame period.

The unit period is a period in which a user is caused to visually recognize an image in which resolution of an image in one frame period designated by the video data Vid-in is reduced to ¼, as the combined image of the liquid crystal panels 100R, 100G, and 100B.

The processing circuit 22 controls the projection position by the optical path shift element 230 in each unit period. Specifically, the processing circuit 22 controls a shift in a direction along the X-axis using a control signal P_x with respect to the optical path shift element 230, and controls a shift in a direction along the Y-axis using a control signal P_y.

The projection position for each unit period, and which of the video pixels designated by the video data Vid-id in correspondence to each of the projection positions is expressed by the panel pixel will be described below in greater detail. Further, the processing circuit 22 also generates a control signal Ctr for controlling the liquid crystal panels 100R, 100G, and 100B in each unit period.

The conversion circuit 23R converts the pixel data Vad_R into a data signal Vid R of an analog voltage, and supplies the data signal Vid R to the liquid crystal panel 100R. The conversion circuit 23G converts the pixel data Vad_G into a data signal Vid_G of an analog voltage, and supplies the data signal Vid_G to the liquid crystal panel 100G. The conversion circuit 23B converts the pixel data Vad_B into a data signal Vid B of an analog voltage, and supplies the data signal Vid B to the liquid crystal panel 100B.

Next, the liquid crystal panels 100R, 100G, and 100B will be described. The liquid crystal panels 100R, 100G, and 100B only differ in color, that is, a wavelength of incident light, and have the same structure. Thus, the liquid crystal panels 100R, 100G, and 100B will be generally described using a reference numeral 100 without specifying the color.

Figure 3:
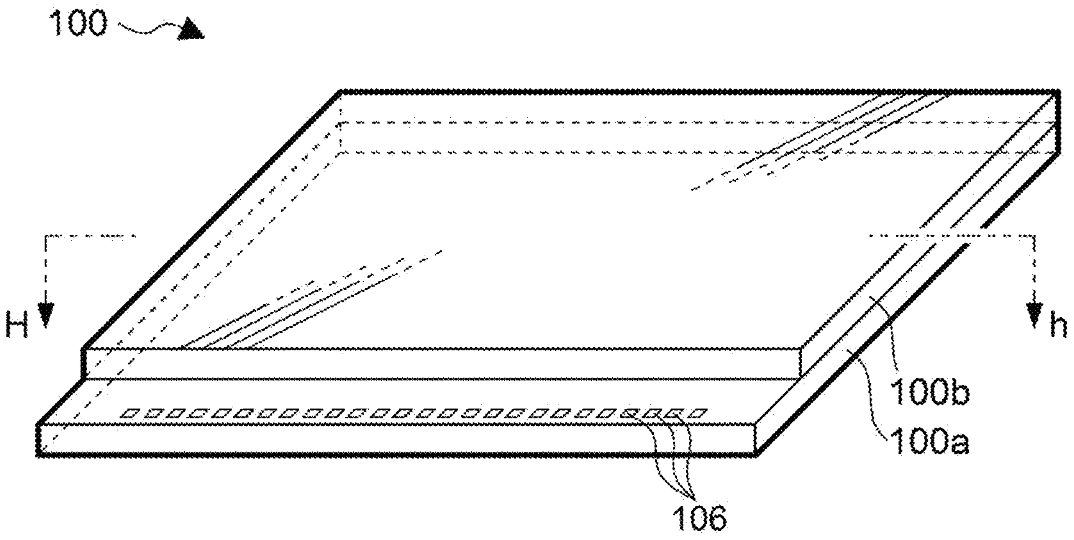
FIG. 3 is a perspective view illustrating a configuration of a liquid crystal panel in the projection type display apparatus.
Figure 4:
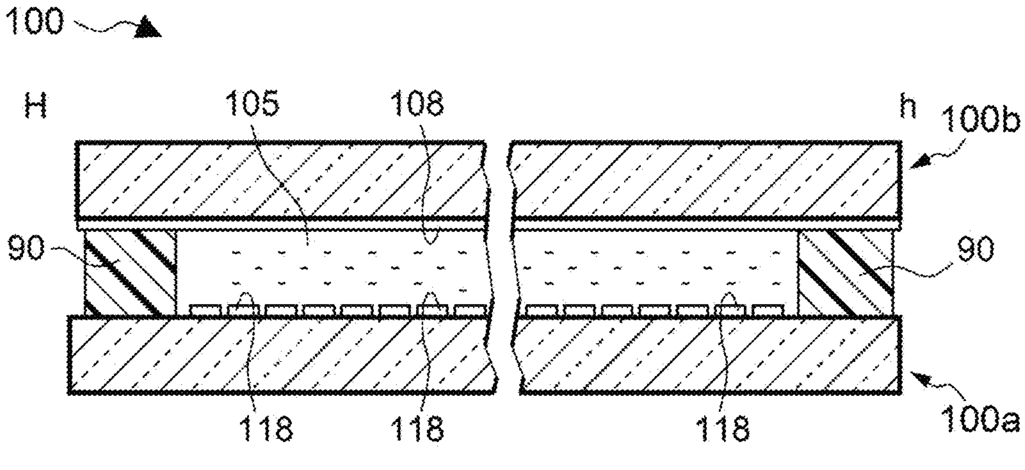
FIG. 4 is a cross-sectional view illustrating a structure of the liquid crystal panel.

FIG. 3 is a diagram illustrating main portions of the liquid crystal panel 100, and FIG. 4 is a cross-sectional view taken along a line H-h in FIG. 3.

As illustrated in FIGS. 3 and 4, in the liquid crystal panel 100, an element substrate 100*a* in which pixel electrodes 118 are provided and a facing substrate 100*b* in which a common electrode 108 is provided are bonded by a seal material 90 so that electrode-formed surfaces thereof face each other with a constant gap therebetween, and liquid crystal 105 is sealed in the gap.

As the element substrate 100*a* and the facing substrate 100*b*, transmissive substrates such as glass or quartz substrates are used. As illustrated in FIG. 3, one side of the element substrate 100*a* protrudes from the facing substrate 100*b*. In this protruding region, a plurality of terminals 106 are provided along a lateral direction in FIG. 3. One end of a flexible printed circuit (FPC) substrate (not illustrated) is coupled to the plurality of terminals 106. The other end of the FPC substrate is coupled to the display control circuit 20, and the various signals described above are supplied thereto.

On a surface of the element substrate 100*a* facing the facing substrate 100*b*, the pixel electrode 118 is formed by patterning a transparent conductive layer such as indium tin oxide (ITO), for example.

Further, although not particularly illustrated, in the facing substrate 100*b* (or the element substrate 100*a*), a microlens is provided for each panel pixel in order to efficiently send a large amount of light to an opening portion serving as the panel pixel. With this configuration, since light reflected by a light shielding unit is sent into an opening portion of the microlens, light utilization efficiency is enhanced.

Figure 5:
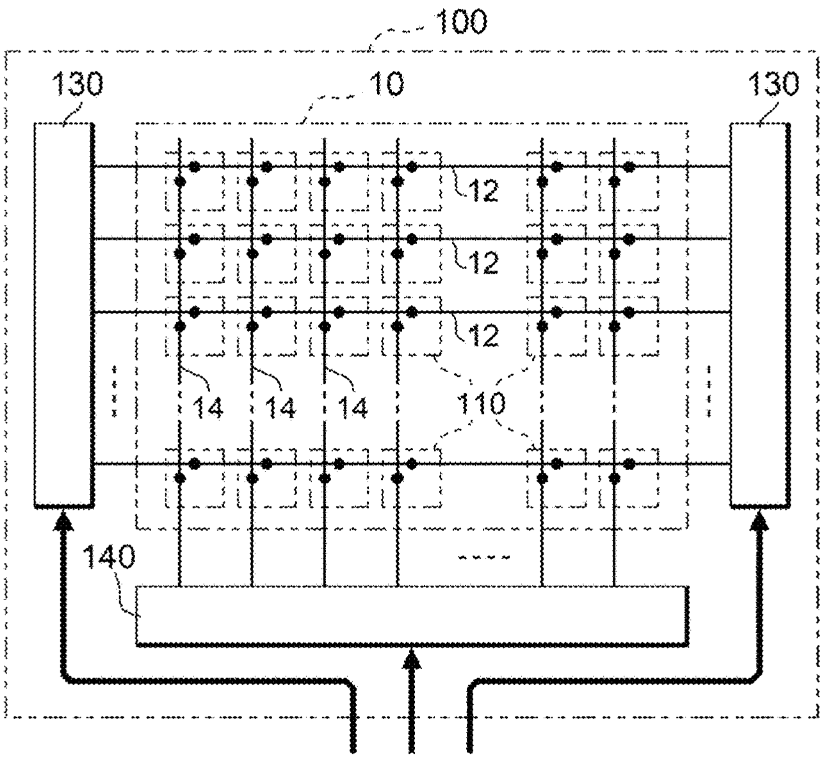
FIG. 5 is a block diagram illustrating an electrical configuration of the liquid crystal panel.

FIG. 5 is a block diagram illustrating an electrical configuration of the liquid crystal panel 100. In the liquid crystal panel 100, a scanning line drive circuit 130 and a data line drive circuit 140 are provided at a peripheral edge of a display region 10.

In the display region 10 of the liquid crystal panel 100, pixel circuits 110 are arrayed in a matrix. Specifically, in the display region 10, a plurality of scanning lines 12 are provided to extend in a lateral direction in FIG. 5, and a plurality of data lines 14 extend in the vertical direction and are provided to be electrically insulated from the scanning lines 12. The pixel circuits 110 are provided in a matrix to correspond to intersections between the plurality of scanning lines 12 and the plurality of data lines 14.

When the number of the scanning lines 12 is m and the number of the data lines 14 is n, the pixel circuits 110 are arrayed in a matrix of m rows in a vertical direction n columns in a horizontal direction. m and n are each an integer equal to or greater than 2. In the scanning lines 12 and the pixel circuits 110, rows of the matrix may be referred as a first, second, third, . . . , (m−1)-th, and m-th rows in order from the top in FIG. 5 in order to distinguish the rows of the matrix from each other. Similarly, in the data lines 14 and the pixel circuits 110, columns of the matrix may be referred as a first, second, third, . . . , (n−1)-th, and n-th columns in order from the left in FIG. 5 in order to distinguish the columns of the matrix from each other.

The scanning line drive circuit 130 selects the scanning lines 12 one by one, for example, in order of the first, second, third, . . . , and m-th rows under the control of the display control circuit 20, and sets a scanning signal to the selected scanning line 12 to a H level. The scanning line drive circuit 130 sets the scanning signals to the scanning lines 12 other than the selected scanning lines 12 to a L level. The data line drive circuit 140 latches, for one row, a data signal supplied from a circuit for corresponding color among processing circuits 220R, 220G, and 220B, and outputs the data signal to the pixel circuit 110 located at that scanning line 12 via the data line 14 in a period in which the scanning signal to the scanning line 12 is at a H level.

Figure 6:
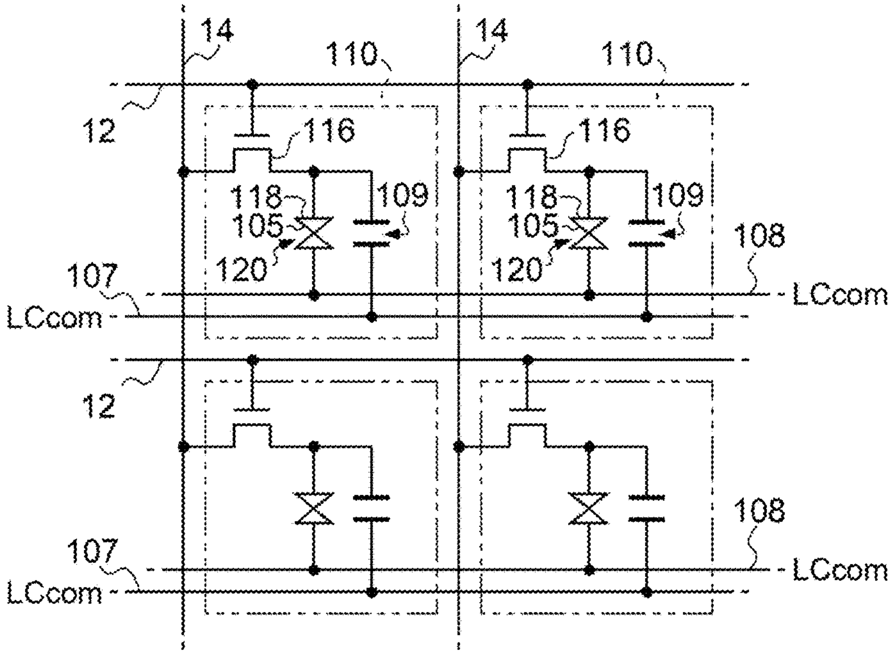
FIG. 6 is a diagram illustrating a configuration of a pixel circuit in the liquid crystal panel.

FIG. 6 is a diagram illustrating an equivalent circuit of a total of four pixel circuits 110 in two rows in a vertical direction and two columns in a horizontal direction corresponding to intersections between two adjacent scanning lines 12 and two adjacent data lines 14.

As illustrated in FIG. 6, the pixel circuit 110 includes a transistor 116 and a liquid crystal element 120. The transistor 116 is, for example, an n-channel thin film transistor. In the pixel circuit 110, a gate node of the transistor 116 is coupled to the scanning line 12, a source node thereof is coupled to the data line 14, and a drain node thereof is coupled to the pixel electrode 118 having a square shape in plan view.

The common electrode 108 is provided commonly for all of the pixels to face the pixel electrodes 118. A voltage LCcom is applied to the common electrode 108. The liquid crystal 105 is interposed between the pixel electrodes 118 and the common electrode 108, as described above. Thus, the liquid crystal element 120 in which the liquid crystal 105 is interposed between the pixel electrodes 118 and the common electrode 108 is formed for each pixel circuit 110.

Further, a storage capacitor 109 is provided in parallel with the liquid crystal element 120. One end of the storage capacitor 109 is coupled to the pixel electrode 118, and the other end thereof is coupled to a capacitor line 107. A temporally constant voltage, for example, the same voltage LCcom as the voltage applied to the common electrode 108, is applied to the capacitor line 107. Since the pixel circuits 110 are arrayed in a matrix in a lateral direction which is a direction in which the scanning line 12 extends and a vertical direction which is a direction in which the data line 14 extends, the pixel electrodes 118 included in the pixel circuits 110 are also arrayed in the lateral direction and the vertical direction.

In the scanning line 12 in which the scanning signal has come to a H level, the transistor 116 of the pixel circuit 110 provided to correspond to the scanning line 12 comes to an ON state. Since the data line 14 and the pixel electrode 118 are electrically coupled to each other as the transistor 116 comes to the ON state, the data signal supplied to the data line 14 reaches the pixel electrode 118 through the transistor 116 that has come to the ON state. When the scanning line 12 comes to the L level, the transistor 116 comes to an OFF state, but the voltage of the data signal which has reached the pixel electrode 118 is held by capacitive properties of the liquid crystal element 120 and the storage capacitor 109.

As is well known, in the liquid crystal element 120, liquid crystal molecular alignment changes according to an electric field generated by the pixel electrode 118 and the common electrode 108. Thus, the liquid crystal element 120 has a transmittance corresponding to an effective value of an applied voltage.

A region functioning as the panel pixel in the liquid crystal element 120, that is, a region having the transmittance corresponding to the effective value of the voltage is a region in which the pixel electrode 118 and the common electrode 108 overlap each other when the element substrate **100*a* and the facing substrate 100*b* are viewed in plan view. Since the pixel electrode 118 has a square shape in plan view, the shape of the pixel of the liquid crystal panel 100 is also a square shape. Further, in the present embodiment, the liquid crystal 105 is of a vertical alignment (VA) type and is in a normally black mode in which the transmittance is lowest when the voltage applied to the liquid crystal element 120** is zero, and the transmittance increases as the applied voltage increases.

An operation of supplying the data signal to the pixel electrode 118 of the liquid crystal element 120 is executed in order of the first, second, third, . . . , and m-th rows in one unit period. Accordingly, a voltage corresponding to the data signal is held in each of the liquid crystal elements 120 of the pixel circuits 110 arrayed in m rows and n columns, each liquid crystal element 120 comes to have a target transmittance, and a transmitted image of a corresponding color is generated by the liquid crystal elements 120 arrayed in m rows and n columns. Thus, generation of the transmitted image is executed for each of RGB, and a color image obtained by combining RGB is projected onto the screen Scr.

The pixel data Vad_R, Vad_G, and Vad_B of the video pixel output from the processing circuit 22 to correspond to one unit period are the pixel data of the video pixel corresponding to that unit period. Thus, in the unit period, a combined color image corresponding to a projection position is projected at the projection position.

As described above, the array of the video pixels in the video data Vid-in are twice in both the vertical direction and the lateral direction with respect to the m rows and n columns that are an array of the panel pixels in the liquid crystal panels 100R, 100G, and 100B, and are 2m rows and 2n columns. In other words, the array of the panel pixels is half the size of the array of the video pixels in both the vertical direction and the lateral direction.

Thus, in the present embodiment, in one frame period, one panel pixel is shifted at a total of four locations including two points in a vertical direction and two points in a lateral direction, so that the one panel pixel is visually recognized as if the panel pixel indicates four video pixels designated by the video data Vid-in.

Figure 7:
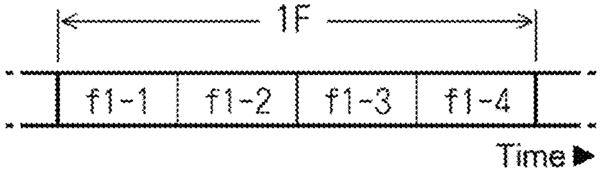
FIG. 7 is a diagram illustrating one frame period and unit periods in the projection type display apparatus in the first embodiment.

FIG. 7 illustrates a diagram illustrating a relationship between the frame and the unit period in the first embodiment. As illustrated in FIG. 7, in the present embodiment, one frame (1F) period is divided into four unit periods. In order to distinguish the four unit periods in one frame period from each other, reference signs are assigned as f1-1, f1-2, f1-3, and f1-4 in a chronological order for convenience.

The number of unit periods included in one frame period, which is "4", is an example of an integer k equal to or greater than 2.

The one frame period is a period in which one frame of the image indicated by the video data Vid-in from the high-level apparatus is supplied, and is 16.7 milliseconds of one period when a frequency of a vertical synchronization signal included in the synchronization signal Sync is 60 Hz In this case, a length of each unit period is 4.17 milliseconds that is ¼ of a length of the one frame period.

Figure 8:
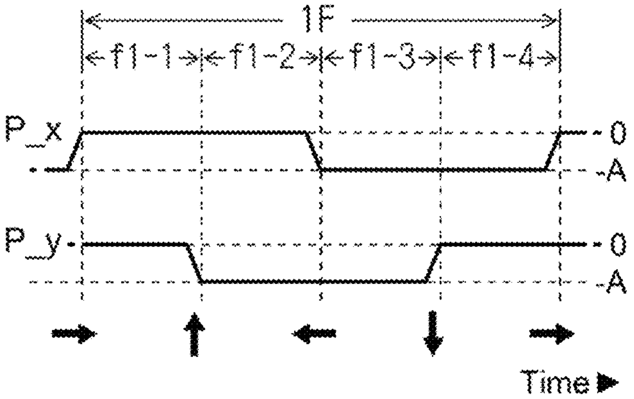
FIG. 8 is a diagram illustrating an operation of an optical path shift element in the first embodiment.

FIG. 8 is a diagram illustrating an example of waveforms of the control signals P_x and P_y supplied to the optical path shift element 230.

The optical path shift element 230 shifts the image projected onto the screen Scr in a direction along the X-axis and the Y-axis with respect to the projection surface. For convenience, an amount of shift will be described in which the amount of shift is converted into a size of the pixel projected onto the screen Scr, that is, a size of the panel pixel.

In the present embodiment, the control signals P_x and P_y have a level of one of two values including 0 and −A in a period other than a rear end period of the unit periods f1 to f4. The levels of the control signals P_x and P_y change in the rear end period. The rear end period is a period corresponding to a vertical scanning flyback period.

The level of the control signal P_x or P_y may be constant over two consecutive unit periods.

The projection position in the period other than the rear end period in the unit period f1-1 in the one frame period, that is, the projection position in a period in which the levels of the control signals P_x and P_y are 0 is set as a reference position described above.

When a level of the control signal P_x is −A, the optical path shift element 230 shifts the projection position from the reference position by half of the panel pixel in the direction opposite to the X direction. Further, when a level of the control signal P_y is −A, the optical path shift element 230 shifts the projection position from the reference position by half of the panel pixel in the direction opposite to the Y direction.

An arrow illustrated in the rear end period of each of the unit periods in FIG. 8 indicates in which direction the projection position is shifted when the levels of the control signals P_x and P_y are changed or maintained in the rear end period.

Further, the shift of the projection position by the optical path shift element 230 is not performed according to the levels of the control signals P_x and P_y, and may be accompanied by a time delay.

Next, a description will be given as to whether the G component of which of the video pixels of the video data Vid-in is expressed by the panel pixel of G by the liquid crystal panel 100G in one frame period. The panel pixel expressing a certain video pixel means that the panel pixel has luminance (brightness) corresponding to the gradation level designated by the pixel data according to the data signal corresponding to the video pixel.

Figure 9:
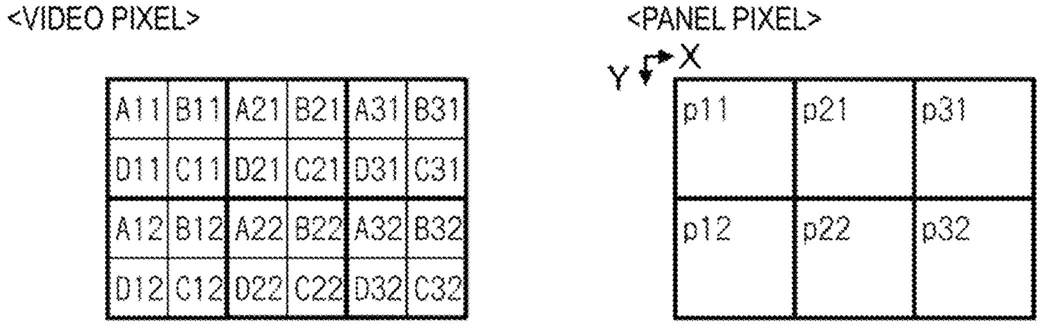
FIG. 9 is a diagram illustrating, for example, a relationship between an array of video pixels and an array of panel pixels.

A left field in FIG. 9 illustrates a diagram in which only a part of the video image indicated by the video data Vid-in is extracted in order to describe the array of the video pixels. Further, a right field in FIG. 9 is a diagram illustrating the array of the panel pixels corresponding to the array of the video pixels in the left field among the panel pixels of G.

In the left field of FIG. 9, for convenience, A11, B11, A21, B21, A31, and B31 are assigned to a first row as reference signs, respectively, in order to distinguish the video pixels of the video data Vid-in. Similarly, reference signs are also assigned to second to fourth rows, as illustrated in FIG. 9.

In the right field of FIG. 9, for convenience, p11, p21, and p31 are assigned to a first row, and p12, p22, and p32 are assigned to a second row as reference signs, in order to distinguish the panel pixels.

Figure 10:
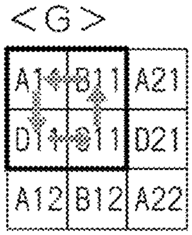
FIG. 10 is a diagram illustrating an order of pixel data supplied to panel pixels of G in the first embodiment.

FIG. 10 is a diagram illustrating order of video pixels (G component) expressed by one panel pixel p11 in G in one frame period. In FIG. 10, a thick line surrounding a total of four video pixels in two vertical rows and two horizontal columns indicates a group of video pixels expressed by the panel pixel p11 of G. As illustrated in FIG. 10, the panel pixel p11 expresses video pixels C11, B11, A11, and D11 in this order in one frame period.

Figure 11:
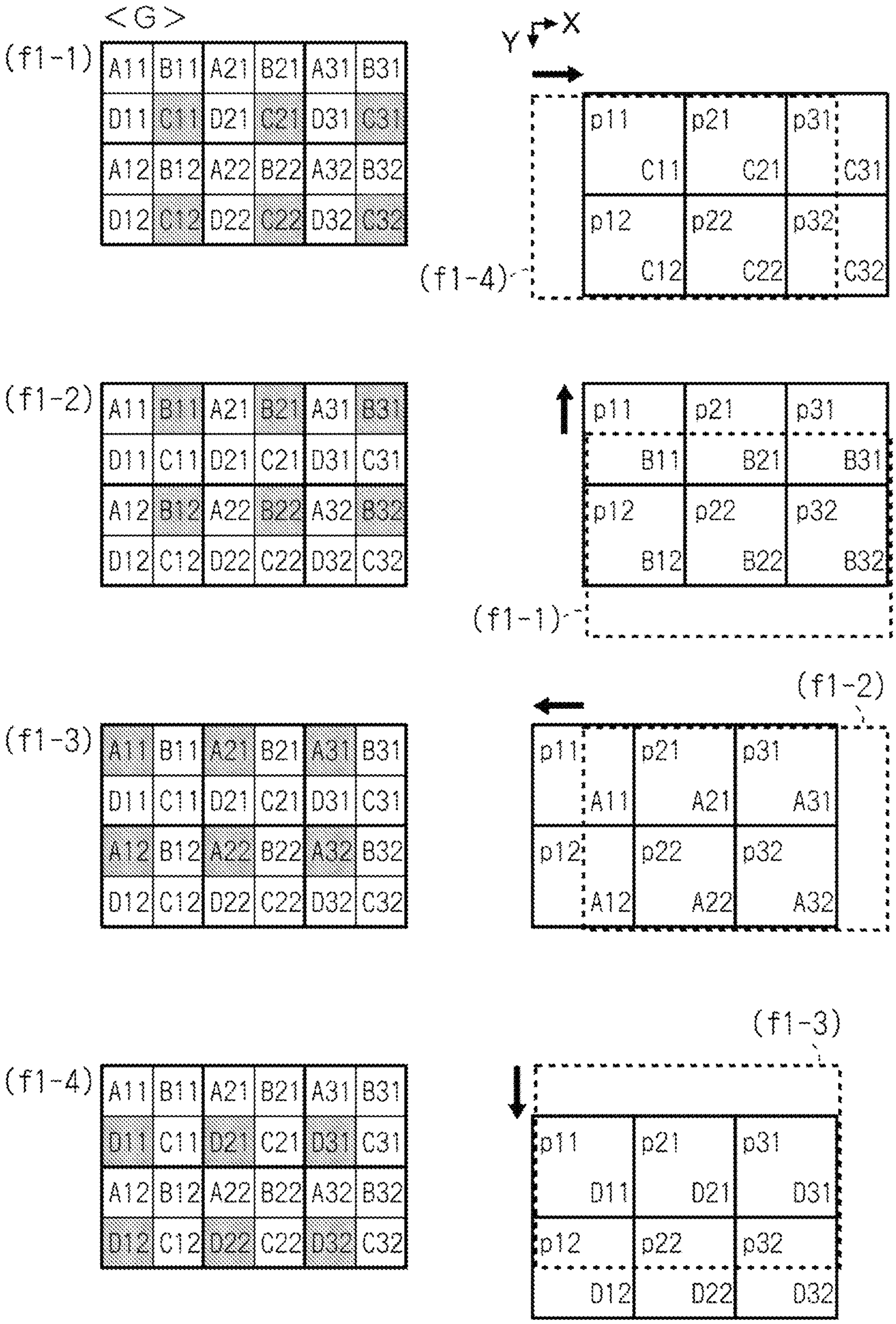
FIG. 11 is a diagram illustrating a relationship between video pixels, panel pixels, and projection positions in one frame period in the first embodiment.
Figure 12:
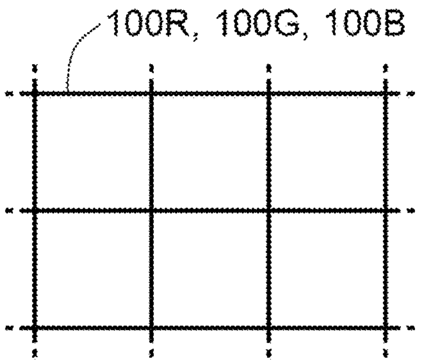
FIG. 12 is a diagram illustrating positions of panel pixels in a projected image in a comparative example.

FIG. 11 is a diagram illustrating which video pixel is expressed at which projection position by the panel pixel of G in the projection type display apparatus 1 according to the embodiment. Specifically, FIG. 12 is a diagram illustrating at which projection positions the G component of the video pixel in the left field of FIG. 9 is expressed by the six panel pixels in the right field of FIG. 9 in the unit periods f1-1 to f1-4 of the one frame period.

The projection position in the unit period f1-1 of the one frame period is set as the reference position, as described above. As illustrated in FIG. 11, in the unit period f1-1 of the one frame period, the panel pixels p11, p21, p31, p12, p22, and p32 of G express G components of the hatched video pixels C11, C21, C31, C12, C22, and C32 in order.

In the rear end period (vertical flyback period) of the unit period f1-1, the optical path shift element 230 shifts the projection position by 0.5 panel pixels in an upward direction (the direction opposite to the Y direction) in FIG. 11 from the reference position in the unit period f1-1 indicated by a dashed line. In the next unit period f1-2, the panel pixels p11, p21, p31, p12, p22, and p32 express the G components of the hatched video pixels B11, B21, B31, B12, B22, B32 in order.

In the rear end period of the unit period f1-2, the optical path shift element 230 shifts the projection position by 0.5 panel pixels in a leftward direction (the direction opposite to the X direction) in FIG. 11 from the projection position in the unit period f1-2 indicated by a dashed line. In the next unit period f1-3, the panel pixels p11, p21, p31, p12, p22, and p32 express the G components of the hatched video pixels A11, A21, A31, A12, A22, and A32 in order.

In the rear end period of the unit period f1-3, the optical path shift element 230 shifts the projection position by 0.5 panel pixels in a downward direction (the Y direction) in FIG. 11 from the projection position in the unit period f1-3 indicated by a dashed line. In the next unit period f1-4, the panel pixels p11, p21, p31, p12, p22, and p32 express the G components of the hatched video pixels D11, D21, D31, D12, D22, and D32 in order.

In the rear end period of the unit period f1-4, the optical path shift element 230 shifts the projection position by 0.5 panel pixels in a right direction (the X direction) in FIG. 11 from the projection position in the unit period f1-4 indicated by a dashed line and returns the projection position to the reference position.

In the next one frame period, the panel pixels repeat an operation of expressing the video pixels at the projection positions of the unit periods f1-1 to f1-4.

As illustrated in FIG. 11, the panel pixels p11, p21, p31, p12, p22, and p32 of G express the video pixels C11, C21, C31, C12, C22, and C32 in order in the unit period 1-1. That is, every other video pixel is represented by a panel pixel in each unit period.

Thus, video pixels that are not adjacent to each other in terms of video pixels but are expressed by panel pixels in the same unit period may be described as being in the same series. In the above example, the video pixels C11, C21, C31, C12, C22 and C32 are in the same series.

Here, a comparative example with respect to the embodiment will be described in order to describe the superiority of the projection type display apparatus 1 according to the embodiment.

As described above, in the projection type display apparatus 1, a color image is projected by combining a red image by the liquid crystal panel 100R, a green image by the liquid crystal panel 100G, and a blue image by the liquid crystal panel 100B.

FIG. 12 is a diagram illustrating a positional relationship between panel pixels in the liquid crystal panels 100R, 100G, and 100B according to a comparative example when viewed in a projected image. As illustrated in FIG. 12, the panel pixel of the liquid crystal panel 100R, the panel pixel of the liquid crystal panel 100G, and the panel pixel of the liquid crystal panel 100B are in a positional relationship in which the panel pixels match when the panel pixels are combined.

Figure 13:
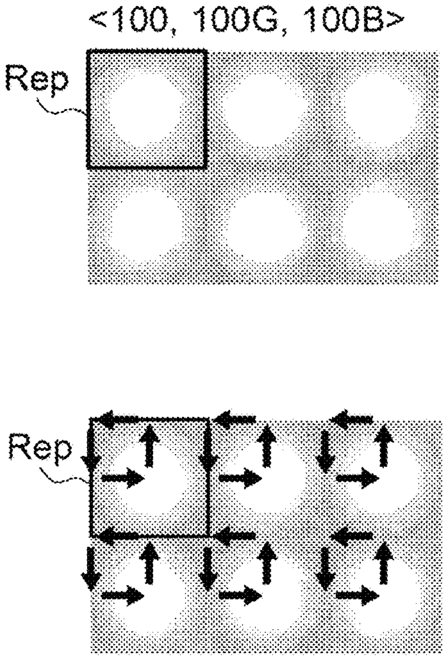
FIG. 13 is a diagram illustrating display unevenness in a comparative example.
Figure 13:
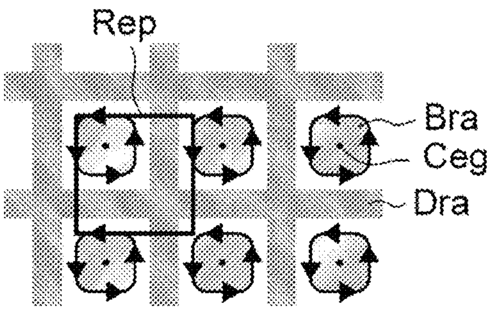

FIG. 13 is a diagram illustrating display unevenness in a comparative example. A microlens is provided for each panel pixel in the liquid crystal panels 100R, 100G, and 100B in order to increase light use efficiency, as described above. Therefore, the panel pixels are not uniform and actually become bright in the vicinity of a center and become dark toward the outer side from the vicinity of the center, as illustrated in an upper field of FIG. 13. A frame Rep indicates an outer edge of the panel pixel by the liquid crystal panels 100R, 100G, and 100B at the reference position.

The panel pixels visually recognized in this manner are shifted by 0.5 pixels in the upward direction→the leftward direction→the downward direction→the rightward direction in order from the reference position, as illustrated in a middle field of FIG. 13 in the unit periods f1-1 to f1-4.

Therefore, when viewed through one frame period, in the panel pixel, a bright region is separated into a bright region Bra visually recognized as a relatively bright region and a dark region Dra other than the bright region Bra as a result of the bright region circulating along a path indicated by an arrow in a lower field of FIG. 13. This is visually recognized as the display unevenness.

The arrow in FIG. 13 indicates a movement direction due to shift of a center of the panel pixel in plan view. The center of the panel pixel in plan view is also a center of the bright region Bra. This display unevenness is easily visually recognized when a relatively bright still image is displayed. Further, although the dark region Dra is shown in a lattice shape in the lower field of FIG. 13, the dark region Dra is actually a region other than the bright region Bra.

Figure 14:
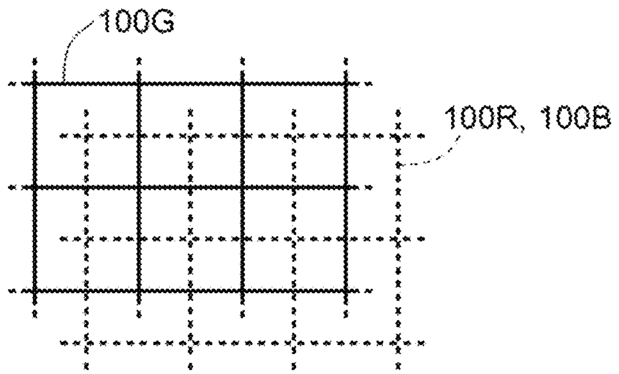
FIG. 14 is a diagram illustrating positions of panel pixels in a projected image in the first embodiment.

Therefore, in the present embodiment, positions of the liquid crystal panels 100R and 100B are shifted by 0.5 pixel in a right direction and 0.5 pixel in a downward direction with respect to the liquid crystal panel 100G illustrated in FIG. 14 in order to curb such display unevenness. Specifically, the liquid crystal panels 100R, 100G, and 100B are attached to the dichroic prism 2112 at positions at which the panel pixels of the liquid crystal panels 100R and 100B are shifted by 0.5 pixel in the X direction and 0.5 pixel in the Y direction with reference to the panel pixel of the liquid crystal panel 100G, when viewed in an image projected onto the screen Scr.

Figure 15:
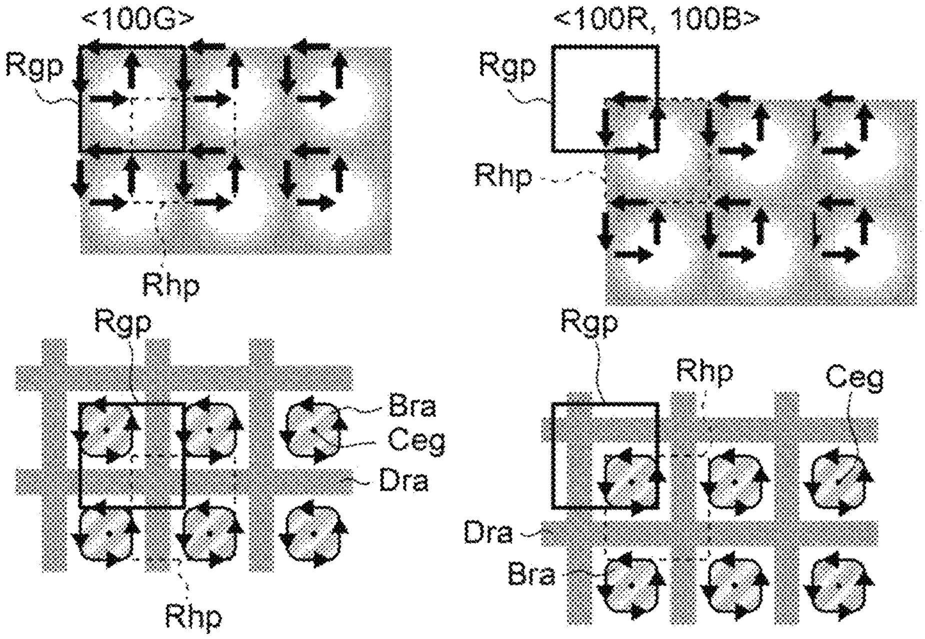
FIG. 15 is a diagram illustrating display unevenness in the first embodiment.

In the present embodiment, the panel pixels of the liquid crystal panel 100G are shifted by 0.5 pixels in the upward direction→the leftward direction→the downward direction→the rightward direction in order from the reference position, similar to the comparative example, as illustrated in an upper left field of FIG. 15 in the unit periods f1-1 to f1-4.

A frame Rgp indicates an outer edge of the panel pixel by the liquid crystal panel 100G at the reference position for convenience of description.

In the single liquid crystal panel 100G, in the panel pixel of G, the bright region is separated into the bright region Bra and the dark region Dra other than the bright region Bra, as in the comparative example, as a result of the bright region circulating along a path indicated by an arrow in a lower left field of FIG. 15, when viewed through in one frame period.

The panel pixels of the liquid crystal panels 100R and 100B are shifted by 0.5 pixels in the upward direction→the leftward direction→the downward direction→the rightward direction in order from the reference position, as illustrated in an upper right field of FIG. 15 in the unit periods f1-1 to f1-4. A frame Rhp indicated by a dashed line indicates an outer edge of the panel pixel at the same position as that of the panel pixel of the frame Rgp when viewed in the matrix array, which are the panel pixels by the liquid crystal panels 100R and 100B at the reference position for convenience of description. The frame Rhp is shifted from the frame Rgp by 0.5 pixel in the right direction and 0.5 pixel in the downward direction. In the combination of the liquid crystal panels 100R and 100G, in the panel pixels of R and B, the bright region is similarly separated into the bright region Bra and the dark region Dra other than the bright region Bra as a result of the bright region circulating along the path indicated by the arrow in a lower right field of FIG. 15, when viewed through one frame period.

Figure 16:
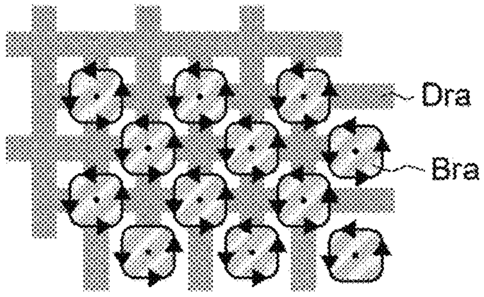
FIG. 16 is a diagram illustrating reduction in the display unevenness in the first embodiment.

However, in the present embodiment, when the panel pixels of the liquid crystal panel 100G illustrated in a lower left field of FIG. 15 are combined with the panel pixels of the liquid crystal panels 100R and 100B illustrated in a lower right field of FIG. 15, the bright regions Bra and the dark regions Dra are alternately shifted and overlapped, as illustrated in FIG. 16. Therefore, with the projection type display apparatus 1 according to the present embodiment, it is possible to reduce display unevenness as compared with the comparative example.

In other words, when a centroid Ceg of the path when the panel pixel is shifted in the liquid crystal panel 100G matches a centroid Ceg of the path when the panel pixel is shifted in the liquid crystal panels 100R and 1000G, the display unevenness is visually recognized as in the comparative example, whereas in the present embodiment, the centroids do not match but differ, and thus, it is possible to reduce the display unevenness as compared to the comparative example.

In the present embodiment, since the positions of the liquid crystal panels 100R and 100B are shifted by 0.5 pixel in a rightward direction and 0.5 pixel in a downward direction from the liquid crystal panel 100G in terms of panel pixels, it is necessary to consider the positional shift between the video pixel of G and the video pixels of R and B. Therefore, when the liquid crystal panel 100G expresses a certain video pixel (G component) in a certain unit period, the liquid crystal panel 100R expresses a video pixel (R component) which is shifted by one pixel in terms of the video pixel in the right direction and shifted by one pixel in terms of the video pixel in the downward direction with respect to the video pixel expressed by the liquid crystal panel 100G. Similarly, the liquid crystal panel 100B expresses a video pixels (B component) shifted by one pixel in the right direction and one pixel in the downward direction with respect to the video pixels expressed by the liquid crystal panel 100G.

Figure 17:
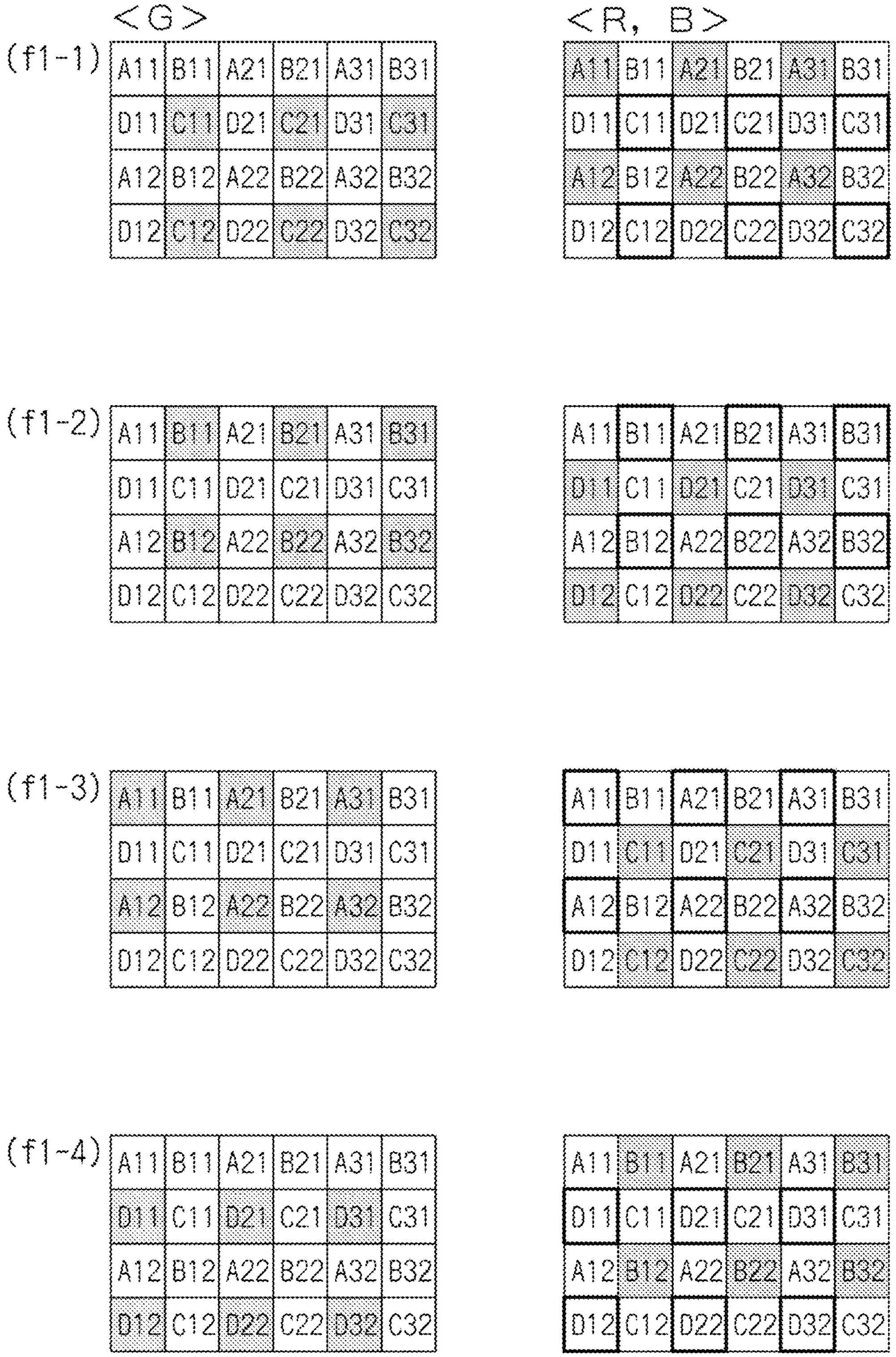
FIG. 17 is a diagram illustrating a positional relationship between video pixels of a G component and video pixels of R and B components read in one frame period in the first embodiment.

To be more specific, when the panel pixels p11, p21, p31, p12, p22, and p32 of the liquid crystal panel 100G express hatched video pixels in a left field of FIG. 17 in the unit periods f1-1 to f1-4, the same panel pixels (of which the positions are shifted by 0.5 pixels in rightward and downward directions) in the liquid crystal panels 100R and 100B express the hatched video pixels in a right field of FIG. 17. The video pixels indicated by thick frames in a right field of FIG. 17 are video pixels represented by the liquid crystal panel 100G. Such a configuration may be, for example, a configuration in which the pixel data Vad_R and Vad_B shifted downward by one row and by one column in the right direction with respect to the pixel data Vad_G read from the buffer by the processing circuit 22 are read.

Figure 18:
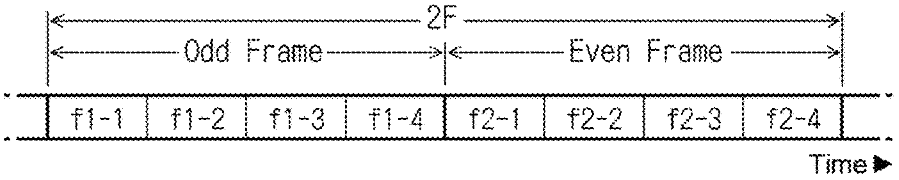
FIG. 18 is a diagram illustrating odd and even frame periods and unit periods in a projection type display apparatus according to a second embodiment.

Next, a second embodiment is described. FIG. 18 illustrates a diagram illustrating a relationship between the frame and the unit period in a second embodiment. As illustrated in FIG. 18, in the present embodiment, a 2-frame (2F) period is divided into a preceding odd frame period and a succeeding even frame period.

The odd frame period is divided into four unit periods, as in the first embodiment. The even frame period is divided into four unit periods, similarly to the odd frame period. Therefore, the number of unit periods in the two frame (2F) period is "8".

In order to distinguish the four unit periods in the odd frame period from each other, reference signs f1-1, f1-2, f1-3, and f1-4 are assigned in a chronological order for convenience. Similarly, the even frame period is divided into four unit periods. In order to distinguish the four unit periods in the even frame period, reference signs f2-1, f2-2, f2-3, and f2-4 are assigned in the chronological order for convenience.

Figure 19:
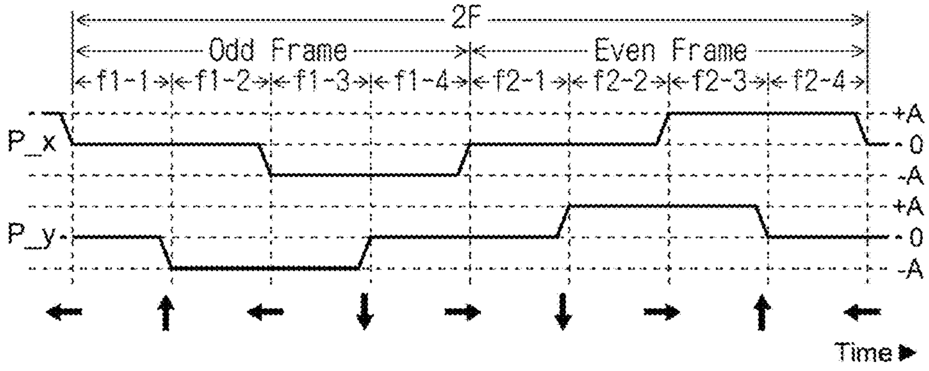
FIG. 19 is a diagram illustrating an operation of an optical path shift element according to the second embodiment.

FIG. 19 is a diagram illustrating an example of waveforms of the control signals P_x and P_y supplied to the optical path shift element 230 in the second embodiment.

In the second embodiment, each of the control signals P_x and P_y has a level of any one of three values including +A, 0, and −A in the period other than the rear-end period of each of the unit periods f1-1 to f1-4 and f2-1 to f2-4.

The projection position when the control signals P_x and P_y are 0 or -A is the same as that in the first embodiment. Further, in the second embodiment, when the level of the control signal P_x is +A, the optical path shift element 230 shifts the projection position by half of the panel pixel in the X direction from the reference position. When the level of the control signal P_y is +A, the optical path shift element 230 shifts the projection position by half of the panel pixel in the Y direction from the reference position.

Next, a description will be given as to which of the video pixels of the video data Vid-in is expressed by the panel pixel of G by the liquid crystal panel 100G in the odd frame period and the even frame period.

Figure 20:
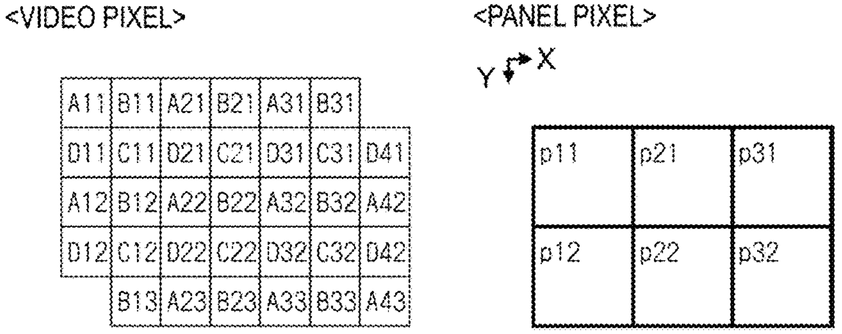
FIG. 20 is a diagram illustrating a relationship between video pixels and panel pixels in the second embodiment.

A left field in FIG. 20 illustrates a diagram in which only a part of the video image designated by the video data Vid-in is extracted in order to describe the array of the video pixels. Further, a right field in FIG. 20 is a diagram illustrating an array of the panel pixels of G corresponding to the array of the video pixels in the left field.

In a left field of FIG. 20, for description, D41, A42, D42, B13, A23, B23, A33, B33, and A43 are added as video pixels as compared with the left field of FIG. 9.

Figure 21:
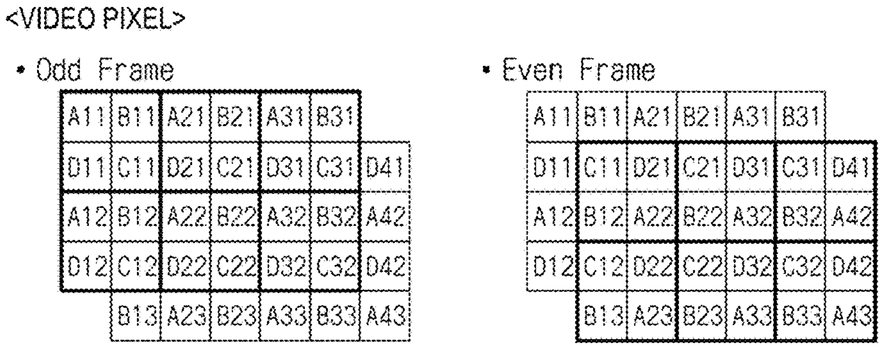
FIG. 21 is a diagram illustrating, for example, a relationship between an array of video pixels and an array of panel pixels.

FIG. 21 is a diagram illustrating the video pixels expressed by the panel pixels in the odd frame period and the even frame period. In FIG. 21, a black frame of a thick line surrounding a total of four video pixels in two vertical rows and two horizontal columns indicates a group of the video pixels expressed by one panel pixel. Four video pixels expressed by one panel pixel are different between the odd frame period and the even frame period. Specifically, 2×2 video pixels expressed in the even frame period by one panel pixel has a relationship that the 2×2 video pixels are shifted by one pixel in terms of the video pixel in a rightward direction and one pixel in terms of the video pixel in a downward direction in the second embodiment, from 2×2 video pixels expressed in the odd frame period by the panel pixel.

Figure 22:
FIG. 22 is a diagram illustrating an order of pixel data supplied to panel pixels of G in the second embodiment.

FIG. 22 is a diagram illustrating an order of the video pixels (G pixels) expressed in the odd frame period and the even frame period by the panel pixel p11 while particularly focusing on the panel pixel p11 of the liquid crystal panel 100G. In the second embodiment, the panel pixel p11 expresses the video pixels C11, B11, A11, and D11 in order, as in the first embodiment, in the unit periods f1-1 to f1-4 of the odd frame period. Further, the panel pixel p11 expresses the video pixels C12, B11, A11, and D11 in order in the unit periods f2-1 to f2-4 of the even frame period. In other words, an order in which the video pixels are expressed in the odd frame period by the panel pixel p11 and an order in which the video pixels are expressed in the even frame period have a point symmetry relationship with reference to the video pixel C11.

Therefore, in the second embodiment, for example, a shift direction from a projection pixel before the shift to a projection pixel after the shift from the unit period f1-1 to the unit period f1-2 of the odd frame period is opposite to a shift direction from the projection pixel before the shift to the projection pixel after the shift from the unit period f2-1 to the unit period f2-2 of the even frame period. Further, for example, a shift direction from the projection pixel before the shift to the projection pixel after the shift from the unit period f1-2 to the unit period f1-3 of the odd frame period is opposite to the shift direction from the projection pixel before the shift to the projection pixel after the shift from the unit period f2-2 to the unit period f2-3 of the even frame period.

Figure 23:
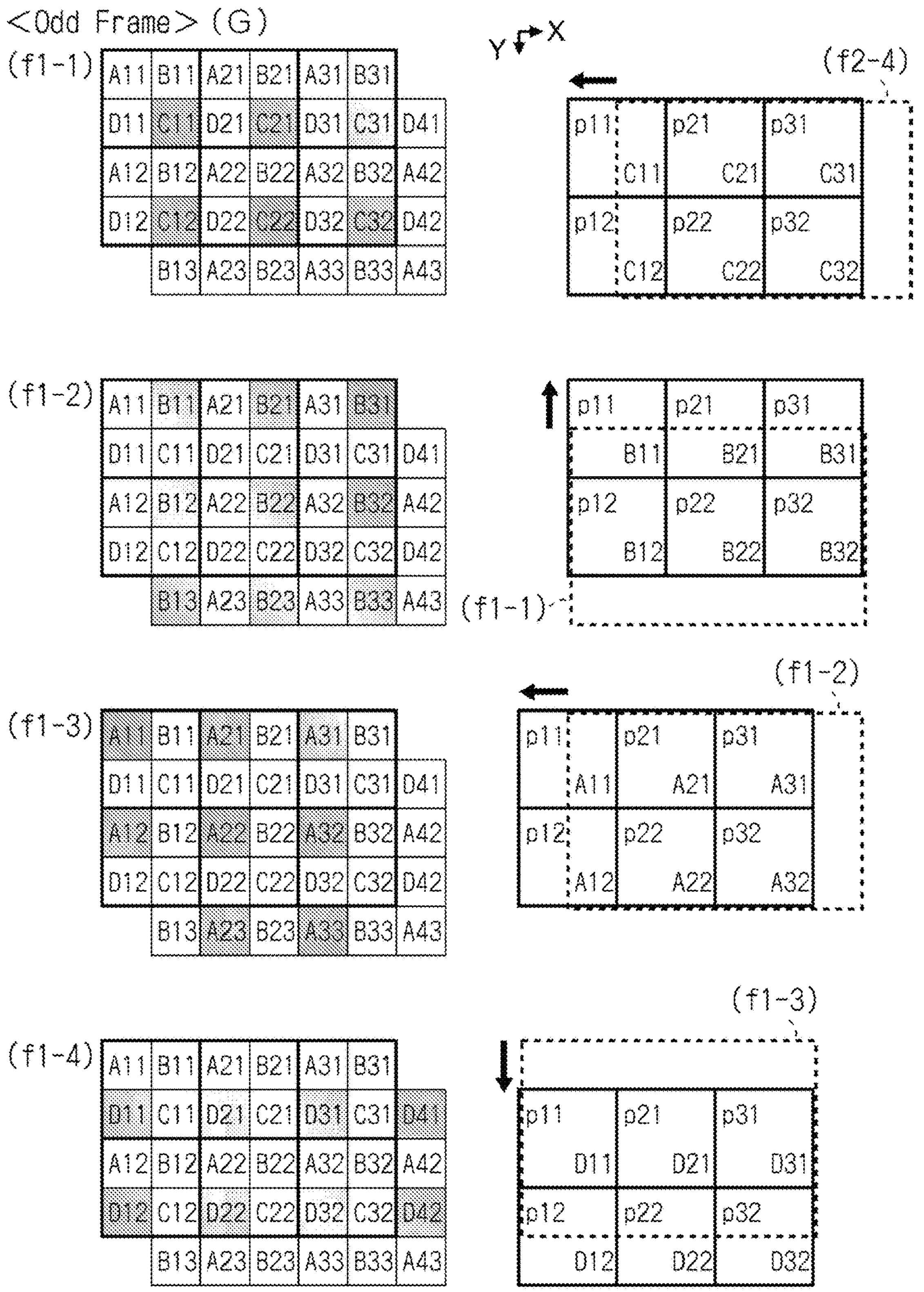
FIG. 23 is a diagram illustrating a relationship between video pixels, panel pixels, and projection positions in an odd frame period in the second embodiment.
Figure 24:
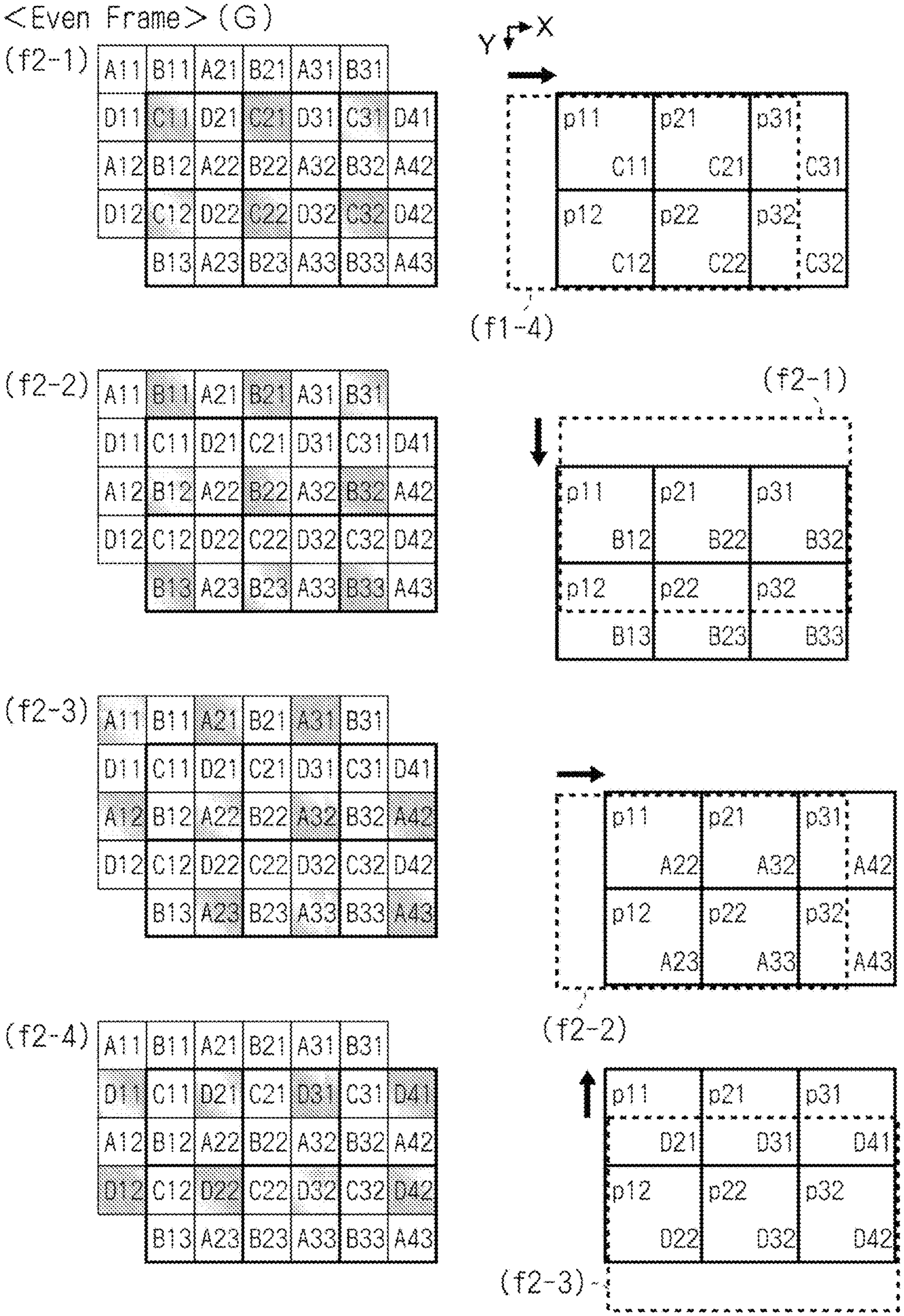
FIG. 24 is a diagram illustrating a relationship between video pixels, panel pixels, and projection positions in an even frame period in the second embodiment.

FIG. 23 and FIG. 24 are diagrams illustrating which video pixel is expressed at which projection position by the panel pixel of the liquid crystal panel 100G in the projection type display apparatus 1 according to a second embodiment. Specifically, FIG. 23 is a diagram illustrating at which projection positions the video pixels in a left field of FIG. 20 are expressed by the six panel pixels in FIG. 20 in the unit periods f1-1 to f1-4 of the odd frame period. Further, FIG. 24 is a diagram illustrating at which projection positions the video pixels are expressed by the six panel pixels in the unit periods f2-1 to f2-4 of the even frame period.

An operation in the odd frame period in the second embodiment (FIG. 23) is the same as the operation in the one frame period in the first embodiment (FIG. 11) except that the direction of returning to the unit period f1-1 is different. Therefore, a period of even frames will be mainly described in the second embodiment.

In the second embodiment, in the rear end period of the unit period f1-4, the optical path shift element 230 shifts the projection position by 0.5 panel pixels in a right direction (the X direction) in FIG. 24 from the projection position in the unit period f1-4 indicated by a dashed line, and returns the projection position to the reference position. In the first unit period f2-1 in the even frame period, the panel pixels p11, p21, p31, p12, p22, and p32 of the liquid crystal panel 100G express the hatched video pixels C11, C21, C31, C12, C22, and C32, respectively. That is, video pixels expressed in the unit period 1-1 by one panel pixel is the same as video pixels expressed in the unit period 2-1 by the one panel pixel. In the rear end period of the unit period f2-1, the optical path shift element 230 shifts the projection position by 0.5 panel pixels in a downward direction (the Y direction) in FIG. 24 from the reference position in the unit period f2-1 indicated by the dashed line. In the next unit period f2-2, the panel pixels p11, p21, p31, p12, p22, and p32 of the liquid crystal panel 100G express the hatched video pixels B12, B22, B32, B13, B23, and B33, respectively. In the rear end period of the unit period f2-2, the optical path shift element 230 shifts the projection position by 0.5 panel pixels in a right direction (the X direction) in FIG. 24 from the projection position in the unit period f2-2 indicated by a dashed line. Further, in the unit period f2-3, the panel pixels p11, p21, p31, p12, p22, and p32 of the liquid crystal panel 100G express the hatched video pixels A22, A32, A42, A23, A33, and A42, respectively. In the rear end period of the unit period f2-3, the optical path shift element 230 shifts the projection position by 0.5 panel pixels in an upward direction (the direction opposite to the Y direction) in FIG. 24 from the projection position in the unit period f2-3 indicated by a dashed line. In the next unit period f2-4, the panel pixels p11, p21, p31, p12, p22, and p32 of the liquid crystal panel 100G express the hatched video pixels D21, D31, D41, D22, D32, and D42, respectively. In the rear end period of the unit period f2-4, the optical path shift element 230 shifts the projection position by 0.5 panel pixels in a left direction (a direction opposite to the X direction) in FIG. 24 from the projection position indicated by a dashed line, and returns the projection position to the reference position.

Figure 25:
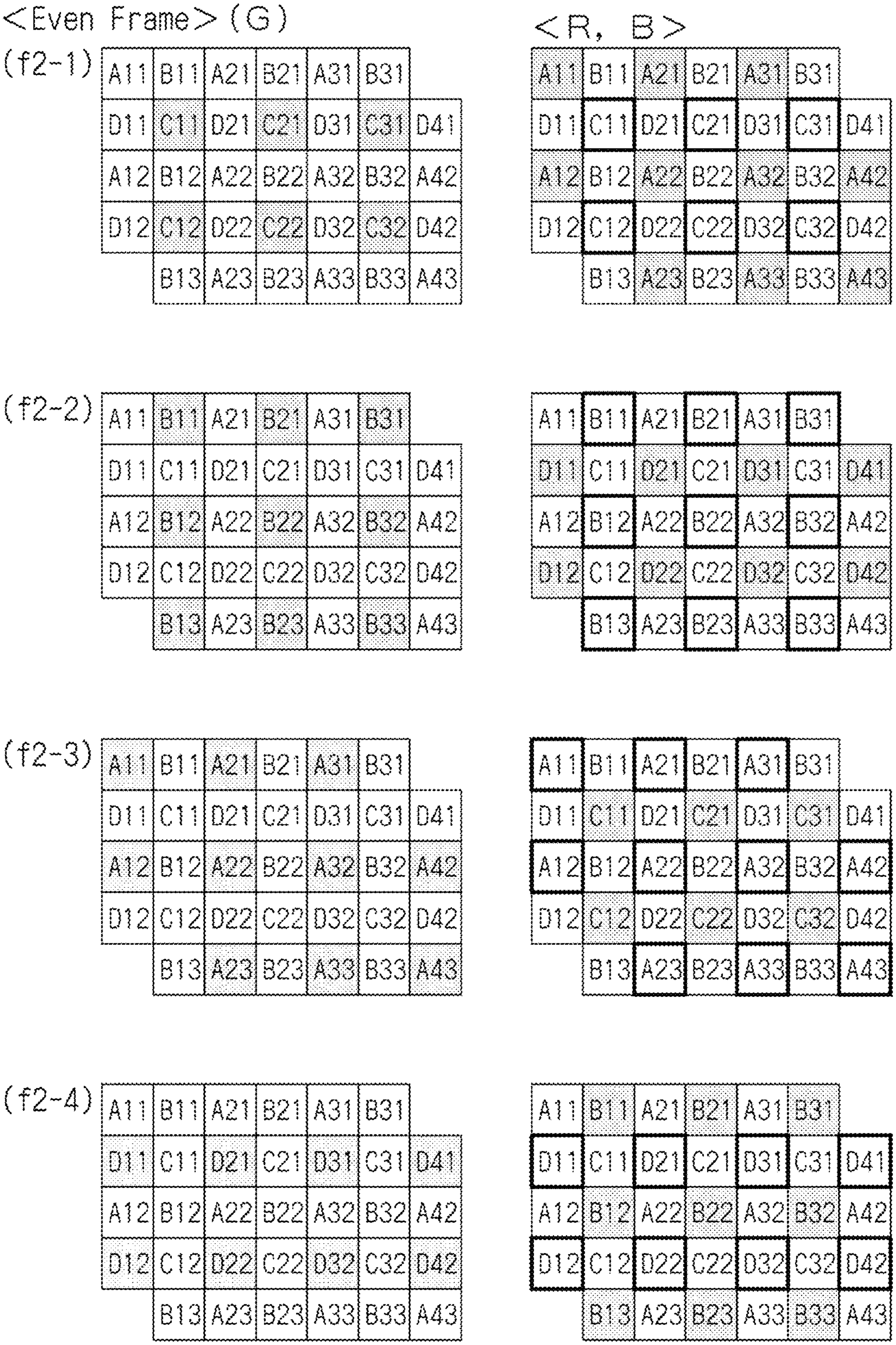
FIG. 25 is a diagram illustrating a positional relationship between video pixels of a G component and video pixels of R and B components read in an even frame period in the second embodiment.

FIG. 25 is a diagram illustrating a positional relationship between the video pixels of the pixel data Vad_G and the video pixels of the pixel data Vad_R and Vad_B read from the processing circuit 22 in the unit periods f2-1 to f2-4 of the even frame period.

To be more specific, when the panel pixels p11, p21, p31, p12, p22, and p32 of the liquid crystal panel 100G express hatched video pixels in a left field of FIG. 25 in the unit periods f2-1 to f2-4, the video pixels shifted by 0.5 pixels in terms of the video pixel in a rightward direction and 0.5 pixels in terms of the video pixel in a downward direction with respect to video pixels are expressed by the same panel pixels (shifted by 0.5 pixels in the rightward and downward directions) in the liquid crystal panels 100R and 100B.

In the second embodiment, the operation in the odd frame period is substantially the same as the operation in the one frame period in the first embodiment.

Therefore, in the odd frame period in the second embodiment, a state visually recognized by the panel pixel of the liquid crystal panel 100G illustrated in the lower left field of FIG. 15 and a state visually recognized by the panel pixel of the liquid crystal panels 100R and 100B illustrated in the lower right field of FIG. 15 are combined. Therefore, since in the odd frame period, the bright region Bra and the dark region Dra are alternately shifted and overlapped as illustrated in FIG. 16, the display unevenness is reduced.

Figure 26:
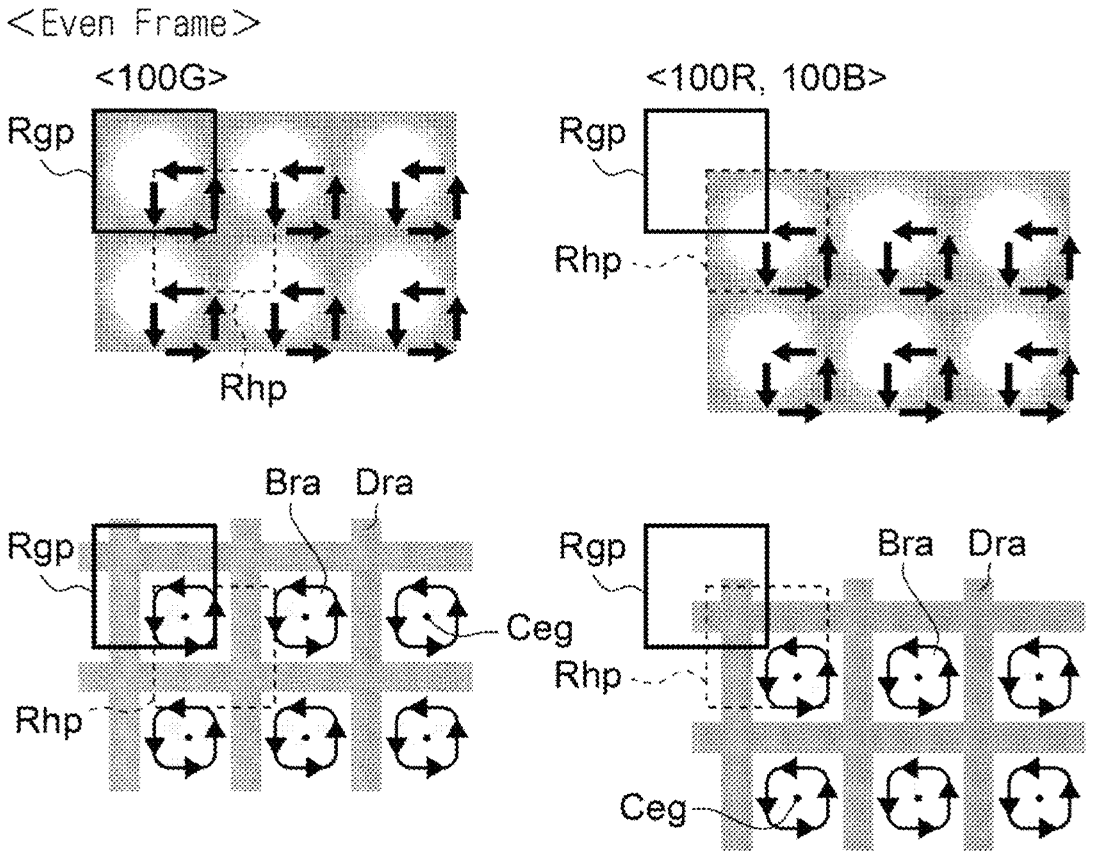
FIG. 26 is a diagram illustrating display unevenness in an even frame period in the second embodiment.

In the second embodiment, the panel pixels of the liquid crystal panel 100G are shifted by 0.5 pixels from the reference position in the downward direction→the rightward direction→the upward direction→the leftward direction in order from the reference position, as illustrated in an upper left field of FIG. 26 in the unit periods f2-1 to f2-4. In the single liquid crystal panel 100G, in the panel pixel, the bright region is divided into a bright region Bra visually recognized as a relatively bright region and a dark region Dra other than the bright region Bra as a result of the bright region circulating along a path indicated by an arrow in a lower left field of FIG. 26, when viewed through in the even frame period.

Further, the panel pixels of the liquid crystal panels 100R and 100B are shifted by 0.5 pixels in the downward direction→the leftward direction→the upward direction→the leftward direction in order from the reference position as illustrated in an upper right field of FIG. 26 in the unit periods f2-1 to f2-4.

In the combination of the liquid crystal panels 100R and 100G, in the panel pixel, similarly, the bright region is separated into the bright region Bra visually recognized as a relatively bright region and the dark region Dra other than the bright region Bra, as a result of the bright region circulating along a path indicated by an arrow in a lower right field of FIG. 26, when viewed through the even frame period.

Figure 27:
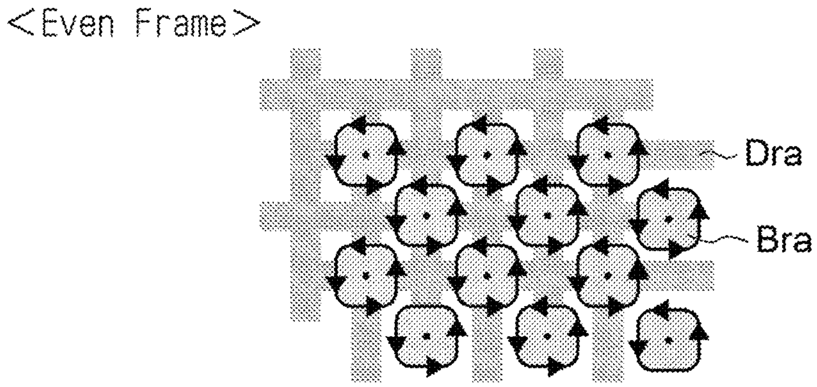
FIG. 27 is a diagram illustrating reduction in display unevenness in the even frame period in the second embodiment.

However, in the second embodiment, since the panel pixels of the liquid crystal panel 100G illustrated in the lower left field of FIG. 26 and the panel pixels of the liquid crystal panels 100R and 100B illustrated in the lower right field of FIG. 26 are combined in the even frame period, the bright regions Bra and the dark regions Dra are alternately shifted and overlapped with each other as illustrated in FIG. 27, and thus, the display unevenness is reduced.

Therefore, with the projection type display apparatus 1 according to the second embodiment, it is possible to reduce the display unevenness in both the odd frame period and the even frame period.

Further, in the second embodiment, for example, the panel pixel p11 of the liquid crystal panel 100G expresses the video pixels C11, B11, A11, and D11 in order in the odd frame period, and expresses the video pixels C11, B12, A22, and D11 in order in the even frame period. Therefore, the order of the video pixels expressed in the odd frame period and the order of the video pixels expressed in the even frame period are aligned in the same series.

The image pixels in the same series often have high correlation or similarity and the same gradation level, particularly when a still image is displayed. When the gradation levels of the video pixels A11 and A22 are the same and an order of the video pixel A11 expressed in the odd frame period is different from an order of the video pixel A12 expressed in the even frame period, expression intervals of the video pixels A11 and A22 become unequal, causing flickering. On the other hand, in the second embodiment, since the order of the series of video pixels expressed in the odd frame period and the even frame period is aligned, the flickering is reduced.

In the first embodiment and the second embodiment described above (hereinafter referred to as an "embodiment and the like"), various modifications or applications can be made as will be described below.

In the embodiment and the like, a configuration in which one frame period is divided into four unit periods is adopted. That is, the description has been given using "4" as an example of k, which is the number of unit periods included in one frame period. k is not limited to "4", and may be "2" or greater.

Although in the embodiment and the like, the positions of the liquid crystal panels 100R and 100B are shifted by 0.5 pixel in the right direction and 0.5 pixel in the downward direction from the liquid crystal panel 100G in terms of panel pixels, other configurations may be adopted. For example, the positions of the liquid crystal panels 100G and 100B may be shifted by 0.5 pixel in the right direction and by 0.5 pixel in the downward direction from the liquid crystal panel 100R in terms of panel pixels.

Although in the embodiment and the like, a period in which the levels of the control signals P_x and P_y supplied to the optical path shift element 230 change is a rear end period corresponding to a vertical scanning period in the unit periods f1-1 to f1-4 and f2-1 to f2-4, the shift of the projection position by the optical path shift element 230 may not be performed according to the levels of the control signals P_x and P_y, but may have a time delay, as described above. In such a case, the time delay may be predicted and level change of the control signals P_x and P_y may be started, for example, so that the image formed by the liquid crystal panel 100 in the unit period is shifted to a projection position corresponding to the unit period.

The light of R is an example of the first light, the liquid crystal panel 100R is an example of the first liquid crystal panel, and the panel pixel of the liquid crystal panel 100R is an example of the first panel pixel. The light of G is an example of the second light, the liquid crystal panel 100G is an example of the second liquid crystal panel, and the panel pixel of the liquid crystal panel 100G is an example of the second panel pixel. The light of B is an example of the third light, the liquid crystal panel 100B is an example of the third liquid crystal panel, and the panel pixel of the liquid crystal panel 100B is an example of the third panel pixel.

The X-axis is an example of a first axis, and the Y-axis is an example of a second axis. The odd frame period is an example of a first frame period, and the even frame period is an example of a second frame period. The unit periods f1-1 to f1-4 of the one frame period or the odd frame period are examples of the first to fourth unit periods in the first frame period, and the unit periods f2-1 to f2-4 of the even frame period are examples of the first to fourth unit periods in the second frame period.

The following aspects, for example, are ascertained from the embodiments illustrated above.

A projection type display apparatus according to one aspect (aspect 1) includes a first liquid crystal panel including a first panel pixel corresponding to first light, a second liquid crystal panel including a second panel pixel corresponding to second light, an optical path shift element configured to shift projection positions of the first panel pixel and the second panel pixel, and a display control circuit configured to control the first liquid crystal panel, the second liquid crystal panel, and the optical path shift element, wherein the display control circuit shifts the projection position every k unit period from a first unit period to a k-th unit period included in one frame period, k being an integer equal to or greater than 2 included in one frame period with respect to the optical path shift element, converts pixel data of the first light among pixel data constituting a video image, the pixel data corresponding to the projection position, for each unit period and supplies the converted pixel data to the first panel pixel, and converts pixel data of the second light, the pixel data corresponding to the projection position, for each unit period and supplies the converted pixel data to the second panel pixel, and a centroid of a path on which the first panel pixel is projected from the first unit period to the k-th unit period is different from a centroid of a path on which the second panel pixel is projected from the first unit period to the k-th unit period.

According to the first aspect, since the bright region and the dark region generated in the first panel pixel and the bright region and the dark region generated in the second panel pixel are shifted and overlapped, it is possible to reduce the display unevenness.

In a specific aspect (Aspect 2) of Aspect 1, k is 4, in the first liquid crystal panel, the first panel pixels are arrayed in a matrix along a first direction and a second direction, in the second liquid crystal panel, the second panel pixels are arrayed in a matrix along the first direction and the second direction, and a position of the second panel pixel is shifted by a half size of the panel pixel in the first direction and the second direction from the first panel pixel.

In a specific aspect (Aspect 3) of Aspect 2, the optical path shift element, in the first frame period, shifts a position of the projection pixel in one direction along the first axis from the first unit period to a second unit period, shifts the position of the projection pixel in one direction along the second axis from the second unit period to a third unit period, shifts the position of the projection pixel in the other direction along the first axis from the third unit period to a fourth unit period, and shifts the position of the projection pixel in the other direction along the second axis from the fourth unit period to the first unit period of the second frame period.

In a specific aspect (Aspect 4) of Aspect 3, as for the one frame period, a first frame period and a second frame period are consecutive.

In a specific aspect (Aspect 5) of Aspect 4, the display control circuit controls the optical path shift element so that a shift direction from the position of the projection pixel before the shift to the position of the projection pixel after the shift from the first unit period to the fourth unit period of the first frame period becomes a direction opposite to the shift direction from the position of the projection pixel before the shift to the position of the projection pixel after the shift from the first unit period to the fourth unit period of the second frame period. According to Aspect 5, it is possible to reduce not only the display unevenness but also flickering.

In a specific aspect (Aspect 6) of any one of Aspects 1 to 5, the projection type display apparatus further includes a third liquid crystal panel including a third panel pixel corresponding to third light, wherein the third panel pixel overlaps with the first panel pixel when viewed in a projected image. According to Aspect 6, it is possible to perform color display using additive color mixing of the first light, the second light, and the third light.

What is claimed is:

1. A projection type display apparatus comprising:

a first liquid crystal panel including a first panel pixel corresponding to first light;

a second liquid crystal panel including a second panel pixel corresponding to second light;

an optical path shift element configured to shift projection positions of the first panel pixel and the second panel pixel; and a display control circuit configured to control the first liquid crystal panel, the second liquid crystal panel, and the optical path shift element, wherein the display control circuit causes the optical path shift element to shift the projection position every k unit period from a first unit period to a k-th unit period included in one frame period, k being an integer equal to or greater than 2 included in one frame period, converts pixel data of the first light among pixel data constituting a video image, the pixel data corresponding to the projection position, for each unit period and supplies the converted pixel data to the first panel pixel, and converts pixel data of the second light, the pixel data corresponding to the projection position, for each unit period and supplies the converted pixel data to the second panel pixel, and a centroid of a path on which the first panel pixel is projected from the first unit period to the k-th unit period is different from a centroid of a path on which the second panel pixel is projected from the first unit period to the k-th unit period.

2. The projection type display apparatus according to claim 1, wherein k is 4, in the first liquid crystal panel, the first panel pixels are arrayed in a matrix along a first direction and a second direction, in the second liquid crystal panel, the second panel pixels are arrayed in a matrix along the first direction and the second direction, and a position of the second panel pixel is shifted by half a size of the panel pixel in the first direction and the second direction from the first panel pixel.

3. The projection type display apparatus according to claim 2, wherein the optical path shift element, in the first frame period, shifts a position of the projection pixel in one direction along the first axis from the first unit period to a second unit period, shifts the position of the projection pixel in one direction along the second axis from the second unit period to a third unit period, shifts the position of the projection pixel in the other direction along the first axis from the third unit period to a fourth unit period, and shifts the position of the projection pixel in the other direction along the second axis from the fourth unit period to the first unit period of the second frame period.

4. The projection type display apparatus according to claim 3, wherein as for the one frame period, a first frame period and a second frame period are consecutive.

5. The projection type display apparatus according to claim 4, wherein the display control circuit controls the optical path shift element so that a shift direction from the position of the projection pixel before the shift to the position of the projection pixel after the shift from the first unit period to the fourth unit period of the first frame period becomes a direction opposite to the shift direction from the position of the projection pixel before the shift to the position of the projection pixel after the shift from the first unit period to the fourth unit period of the second frame period.

6. The projection type display apparatus according to claim 1, further comprising:

a third liquid crystal panel including a third panel pixel corresponding to third light, wherein the third panel pixel overlaps with the first panel pixel when viewed in a projected image.

* * * * *